3,124,512
COMPOSITIONS FOR USE IN CARIES
PROPHYLAXIS
Hans Schmid, Muttenz, and Hans Rudolf Mühlemann, Zurich, Switzerland, assignors to GABA A.G., Basel, Switzerland, a Swiss company
No Drawing. Filed May 25, 1959, Ser. No. 815,253
Claims priority, application Switzerland May 29, 1958
11 Claims. (Cl. 167—93)

The present invention relates to quaternary ammonium fluorides as well as to methods for the manufacture thereof. Moreover, this invention is concerned with compositions containing said quaternary ammonium fluorides for use in caries prophylaxis.

In recent years research has shown that the element fluorine is of considerable importance in the formation of dentine, and that a deficiency in this element leads to an increased tendency of the teeth to dissolve in acids, thus reducing their resistance to caries. Besides, it is known that the acids responsible for a slow dissolution of dentine are formed by bacterial and enzymatic decomposition, respectively, of food particles.

By providing a sufficiency of the element fluorine the solubility of the dental enamel in acids can be significantly reduced, the introduction of fluorine being possible, as is known, prior to dentition through the medium of the blood and after dentition by external application. For the latter purpose fluorine has generally been used in the form of an inorganic compound, e.g. in the form of an alkali metal fluoride, tin fluoride, silicofluoride and as a complex fluoride of an element of group IV of the periodic system (British specification No. 644,339).

It has now been found that quaternary ammonium fluorides reduce the solubility of the dental enamel in acids in a significant manner. The incorporation of one or several long-chain radicals moreover imparts foaming, wetting and in particular bactericidal properties to the fluoride. Thus when applied externally in the cavity of the mouth, they are capable of inhibiting the cleavage of carbohydrate-containing remainders of foodstuffs into acidic, enamel-dissolving decomposition products. These cation-active ammonium fluorides are thus active agents for the caries prophylaxis, on the one hand due to their ability to increase the resistance of the dental enamel to the action of acids (fluorine action) and on the other hand due to their bactericidal activity.

The compounds of the present invention are quaternary ammonium fluorides which are characterised by comprising the atomic grouping of the following general formula $$\left[-\overset{+}{\underset{R}{N}}\diagup\right] F^-$$

where R represents hydrogen, or an alkyl, alkenyl, alkylol, alkoxyalkyl, aryl, aryloxyalkyl, aralkyl, cycloalkyl, cycloalkenyl or heterocyclic radical, or an additional quaternary ammonium radical which may be attached to the nitrogen atom by a bridging group, or a radical of the formula $-R_4-CO.Y$ wherein Y represents OH, alkoxy, cycloalkoxy, aralkoxy or

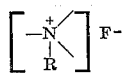

where $R_4$ stands for an alkylene or arylenealkylene radical and each of the symbols $R_5$ and $R_6$ represents hydrogen, or an alkyl, alkenyl, alkylol, aryl, aralkyl, cycloalkyl or heterocyclic radical, or $R_5$ and $R_6$ form together with the nitrogen atom a heterocyclic nucleus, each one of the three free valences being satisfied by an alkyl, alkenyl, alkylol, alkoxyalkyl, aryl, aryloxyalkyl, aralkyl, cycloalkyl, or heterocyclic radical, or two of the free valences being satisfied by a group forming, together with the nitrogen atom, a saturated or unsaturated, unsubstituted or substituted heterocyclic nucleus.

A preferred group of the compounds of the present invention includes quaternary ammonium fluorides having the general formula

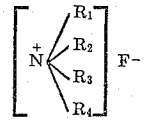

wherein $R_1$ represents a high molecular hydrocarbon radical having a chain length of $C_8$ to $C_{20}$, preferably $C_{12}$ to $C_{18}$, and which may be substituted, or interrupted by hetero atoms, e.g. oxygen, sulfur or nitrogen, or groups such as $-CO-$, $R_2$ has the same meaning as $R_1$ or represents a lower alkyl, lower alkenyl, lower alkylol, (lower alkoxy)-(lower alkyl), aryl, ar(lower alkyl), or lower cycloalkyl radical (where "lower" means radicals having not more than 8 carbon atoms), and $R_3$ and $R_4$ each represent a lower alkyl, lower alkenyl, lower alkylol, lower alkoxy, aryl, ar(lower alkyl), or lower cyclo-alkyl radical (where "lower" means radicals having not more than 8 carbon atoms), or wherein $R_4$ represents a substituted or unsubstituted benzyl, phenylethyl or naphthyl radical, or a phenoxyethyl radical carrying, if desired, substituents in the nucleus, or another quaternary ammonium radical which is attached directly or by a bridging group to the nitrogen atom.

A further preferred group of compounds of this invention which have been found to reduce the solubility of the dental enamel in acids includes heterocyclic ammonium compounds containing at least one quaternary nitrogen atom with anionically bound fluorine. Among these compounds there are pyridinium compounds having the following general formula

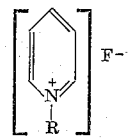

wherein R represents an alkyl, alkenyl, alkylol, alkoxyalkyl, aralkyl, cycloalkyl or heterocyclic radical; and morpholinium or thiomorpholinium compounds having the general formula

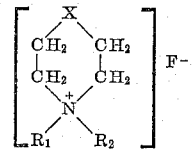

wherein $R_1$ and $R_2$ each represent an alkyl, alkenyl, alkylol, alkoxy, aralkyl, or cycloalkyl radical, and X represents oxygen or sulfur.

Further analogous compounds include picolinium fluorides, piperidinium fluorides, pyrrolidinium fluorides, quinolinium fluorides, indolinium fluorides, etc.

Another preferred group of compounds of this invention includes derivatives of amino acids comprising a quaternary ammonium group and having the general formula

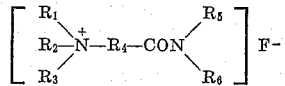

wherein each of the symbols $R_1$, $R_2$ and $R_3$ represents an alkyl, alkenyl, alkylol, alkoxyalkyl, aralkyl, cycloakyl or heterocyclic radical, $R_4$ represents an alkylene or arylene-alkylene radical, and each of the symbols $R_5$ and $R_6$ stands for hydrogen or an alkyl, alkenyl, alkylol, aryl, aralkyl, cycloalkyl or heterocyclic radical.

The following compounds are specific examples of quaternary ammonium fluorides of this invention. Evidently, the invention is not intended to be limited to these compounds.

Octyl-trimethyl-ammonium fluoride,
dodecyl-ethyl-dimethyl-ammonium fluoride,
tetraethyl ammonium fluoride,
dilauryldimethyl-ammonium fluoride,
$\Delta^{8,9}$-octadecenyl-benzyl-dimethyl-ammonium fluoride,
dioctyl-diethyl-ammonium fluoride,
cyclohexyl-cetyl-dimethyl-ammonium fluoride,
furfuryl-lauryl-dimethyl-ammonium fluoride,
phenoxyethyl-cetyl-dimethyl-ammonium fluoride,
N:N'-tetramethyl-N:N'-diluryl-ethylene-diammonium difluoride,
N-cetyl-pyridinium fluoride,
N:N-dilauryl-morpholinium fluoride,
N-myristyl-N-ethyl-morpholinium fluoride,
N-(octylamino-carbonyl-ethyl)-N-benzyl-dimethyl-ammonium fluoride,
N-(2-ethoxy-ethyl)-N-dodecyl-dimethyl-ammonium fluoride,
N-($\omega$-hydroxy-dodecyl)-trimethyl-ammonium fluoride,
N-phenyl-N-hexadecyl-diethyl-ammonium fluoride,
N-cyclohexyl-N-octadecyl-dimethyl-ammonium fluoride,
N-(2-carbomethoxy-ethyl)-N-benzyl-dimethyl-ammonium fluoride,
N-(2-carbocyclohexoxy-ethyl)-N-myristyl-dimethyl-ammonium fluoride,
N-(2-carbobenzyloxy-ethyl)-N-dodecyl-dimethyl-ammonium fluoride,
N-[2-(N':N'-dimethylamino-carbonyl)-ethyl]-N-dodecyl-diethyl-ammonium fluoride,
N-carboxymethyl-N-eikosyl-dimethyl-ammonium fluoride, etc.

The quaternary ammonium fluorides of the present invention are soluble in water, and most of them are also soluble in methanol and ethanol. They are mostly hygroscopic crystalline solids or syrups. Those of the quaternary ammonium fluorides which have long-chain substituents dissolve in water with formation of foaming solutions. They are incompatible with anion-active compounds, such as e.g. alkyl sulfates, alkylaryl sulfates, soaps, etc.

According to the present invention the quaternary ammonium fluorides can be prepared by quaternizing the corresponding substituted secondary or tertiary amines with an organic fluoride. The secondary and tertiary amines used as starting compounds can be obtained by conventional methods. The quaternization is usually carried out by heating, if necessary with the addition of a solvent or diluent.

According to a further embodiment of this invention, the more readily accessible corresponding quaternary ammonium chlorides or bromides are used for preparing the quaternary ammonium fluorides. The chlorides or bromides are reacted in the presence of a solvent with simple metal fluorides in such a manner that the metal chlorides or bromides formed in the reaction precipitate from the solvent. For this purpose metal fluorides can be used which are more readily soluble in the selected solvent than the corresponding chlorides or bromides. The quaternary ammonium fluoride formed during the reaction remains in solution from which it can be recovered by conventional methods after removal of the insoluble salt. Potassium fluoride or silver fluoride are preferably used. The reaction with potassium fluoride is conveniently carried out in ethanol, aqueous ethanol, an ethanol-acetone mixture or a water-acetone mixture.

The reaction with silver fluoride proceeds in an aqueous medium.

The quaternary ammonium fluorides can be mixed with conventional solid or liquid diluents and other additives, such as abrasive agents, fillers, binders, solvents, flavoring agents, etc. in order to prepare compositions having a high caries-prophylactic activity. These compositions can be prepared in the form of tooth pastes or powders, mouth washes, dental preparations for use in dentistry, etc.

The invention will now be illustrated by the following examples which, however, are not intended to limit the scope of the invention in any way.

EXAMPLE 1

To 101 parts by weight of triethylamine are added, while stirring, 188 parts by weight of dodecyl fluoride, and the mixture is maintained at 50° C. for 6 hours. After cooling of the reaction mixture the dodecyl-triethyl-ammonium fluoride is obtained in the form of a hygroscopic crystalline mass. This compound is soluble in water, ethanol and methanol.

EXAMPLE 2

79 parts by weight of pyridine are dissolved in 750 parts by weight of ethanol, and the solution is added, while stirring, to 244 parts by weight of cetyl fluoride at 50° C. The mixture is then refluxed for 2 hours and the solvent is evaporated. The residue consists of cetyl-pyridinium fluoride which is in the form of a crystalline mass. It is soluble in water, ethanol and methanol.

EXAMPLE 3

171.5 parts by weight of phenyl-trimethyl-ammonium chloride are dissolved in 1000 parts by weight of ethanol. 58 parts by weight of powdered potassium fluoride are added to the solution, the mixture is heated to 40–50° C. and allowed to stand overnight with intermittent stirring. The potassium chloride which has precipitated is separated by filtration. The fluoride is recovered from the filtrate by evaporation of the solvent. The residue consists of phenyl-trimethyl-ammonium fluoride which is partly in the form of a syrup and partly in the form of needle-like crystals. It is soluble in water, ethanol and methanol.

The reaction can also be carried out by refluxing for 1 hour.

EXAMPLE 4

30.4 parts by weight of lauryl-benzyl-dimethyl-ammonium bromide are dissolved in 200 parts by weight of water, and to the solution is added an aqueous solution of 12.7 parts by weight of silver fluoride. The precipitated silver bromide is filtered off, and the filtrate is concentrated in vacuo whereby lauryl-benzyl-dimethyl-ammonium fluoride remains as a syrupy liquid which begins to crystalline after standing for a prolonged period.

In addition to the quaternary ammonium fluorides the dental compositions of the present invention may contain conventional additives. In view of the fact that the fluorine is partially deactivated by the more commonly used abrasives, such as calcium carbonate, magnesium carbonate, calcium phosphate, calcium sulfate, kaolin, etc., it is preferable to use the oxides, ortho- or pyro-phosphates of tin or zinc in the compositions of this invention. Moreover, the dental compositions may also contain surface-active substances of non-ionic or cation-active nature as foaming and cleansing agents as well as flavoring agents. In paste-like dental compositions mucilages of non-ionic nature are conveniently used.

Some examples of dental compositions according to the present invention are given hereinafter by way of non-limiting illustration:

EXAMPLE 5

*Toothpaste*

| Ingredients: | Percent by weight |
|---|---|
| Zinc phosphate | 20.0 |
| Titanium dioxide | 2.0 |
| Glycerol | 12.0 |
| Methyl cellulose | 3.0 |
| Flavoring agent | 1.0 |
| Cetyl-pyridinium fluoride | [1] 1.7 |
| Water | 60.3 |

[1] Corresponding to 0.1% F.

The methyl cellulose is dissolved in part of the water to form a mucilage whereupon the quaternary ammonium fluoride dissolved in the remaining amount of water is added. Then glycerol, the flavoring agent and finally the powdered ingredients are incorporated. The mass is thoroughly mixed in a suitable mixer and, if necessary, homogenized in a roller or colloid mill.

Active, gelly-like compositions can also be obtained by omitting the abrasive ingredient and incorporating a small proportion e.g. of titanium dioxide as a pigmenting agent. This is illustrated in the following example.

EXAMPLE 6

| Ingredients: | Percent by weight |
|---|---|
| Titanium dioxide | 2.0 |
| Mucilage gelly from powdered fruit-kernels | 79.57 |
| Glycerol | 16.0 |
| Flavoring agent | 1.0 |
| Saccharin | 0.1 |
| Lauryl-benzyl-dimethyl ammonium fluoride | [1] 1.33 |

[1] Corresponding to 0.075% F.

The pH values of the above described compositions will vary between 3.5 and 7.0, preferably between 3.8 and 5.5. The proportion of quaternary ammonium fluoride, calculated as fluorine, is 0.01 to 2%, preferably 0.05 to 0.3%.

EXAMPLE 7

A mouth wash having the following composition is prepared:

| Ingredients: | Percent by weight |
|---|---|
| Ethyl alcohol | 71.75 |
| Glycerol | 12.0 |
| Flavoring agent | 6.0 |
| Dodecyl-ethyl-dimethyl-ammonium fluoride | 10.25 |

Prior to use, this composition is diluted, e.g. by adding 2 ml. of the concentrate to 50 ml. of water, to obtain a fluorine concentration of 0.03%.

The quaternary ammonium fluoride is dissolved in ethyl alcohol. Glycerol and the flavoring ingredient are added to this solution.

EXAMPLE 8

A tooth powder may be prepared as follows:

| Ingredients: | Percent by weight |
|---|---|
| Zinc pyrophosphate | 96.32 |
| Flavoring agent | 1.0 |
| Phenoxyethyl - cetyl - dimethyl - ammonium fluoride | [1] 2.18 |
| Citric acid | 0.5 |

[1] Corresponding to 0.1% F.

Zinc pyrophosphate and citric acid are well mixed with the active ingredient in a suitable mixer. The mixture is, if necessary, finely ground, and finally the flavoring ingredient is stirred in.

It will be understood that the present invention is in no way limited to the above specific examples. Various other quaternary ammonium fluorides of this invention can be substituted for those specifically mentioned in the examples.

We claim:

1. A dental composition for caries prophylaxis comprising (1) a water-soluble quaternary ammonium fluoride having the structural formula:

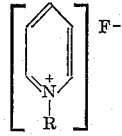

wherein R is an alkyl radical having from 8 to 20 carbon atoms,
said water-soluble quaternary ammonium fluoride being present in an amount sufficient to provide from about .01% to about 2.0% by weight of the total composition of ionizable fluorine, and (2) a fluorine-compatible carrier, said composition being essentially free of anion-active adjuvants.

2. A composition according to claim 1 wherein the quaternary ammonium fluoride is N-cetyl-pyridinium fluoride.

3. A dental composition for caries prophylaxis comprising (1) a water-soluble quaternary ammonium fluoride having the structural formula:

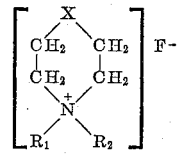

wherein $R_1$ is an alkyl radical having not more than 20 carbon atoms, $R_2$ is an alkyl radical having from 8 to 20 carbon atoms and X is a member selected from the group consisting of oxygen and sulfur,
said water-soluble quaternary ammonium fluoride being present in an amount sufficient to provide from about .01% to about 2.0% by weight of the total composition of ionizable fluorine, and (2) a fluorine-compatible carrier, said composition being essentially free of anion-active adjuvants.

4. A composition according to claim 3 wherein the quaternary ammonium fluoride is N:N-dilauryl-morpholinium fluoride.

5. A composition according to claim 3 wherein the quaternary ammonium fluoride is N-myristyl-N-ethyl-morpholinium fluoride.

6. A dental composition for caries prophylaxis comprising (1) a water-soluble quaternary ammonium fluoride having the structural formula:

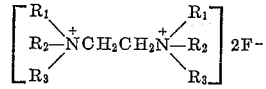

wherein $R_1$ is an alkyl radical having from 8 to 20 carbon atoms and $R_2$ and $R_3$ are lower alkyl radicals,
said water-soluble quaternary ammonium compound being present in an amount sufficient to provide from about .01% to about 2.0% by weight of the total composition of ionizable fluorine and (2) a fluorine-compatible carrier, said composition being essentially free of anion-active adjuvants.

7. A composition according to claim 6 wherein the quaternary ammonium fluoride is N:N'-tetramethyl-N:N'-dilauryl-ethylene-diammonium difluoride.

8. A dental composition for caries prophylaxis comprising (1) a water-soluble quaternary ammonium fluoride having the structural formula:

wherein $R_1$ is an alkyl radical having from 8 to 20 carbon atoms, $R_2$, $R_3$, and $R_5$ are lower alkyl radicals, $R_4$ is a lower alkylene radical, and $R_6$ is a member selected from the group consisting of hydrogen and a lower alkyl radical, said water-soluble quaternary ammonium fluoride being present in an amount sufficient to provide from about .01% to about 2.0% by weight of the total composition of ionizable fluorine, and (2) a fluoride-compatible carrier, said composition being essentially free of anion-active adjuvants.

9. A composition according to claim 8 wherein the quaternary ammonium fluoride is N-(octylamino-carbonylethyl)-N-benyyl-dimethyl-ammonium fluoride.

10. A composition according to claim 8 wherein the quaternary ammonium fluoride is N-[2-(N':N'-dimethyl-aminocarbonyl)-ethyl] - N - dodecyl-diethyl-ammonium fluoride.

11. A dental composition for caries prophylaxis comprising (1) N-(2-carbocyclohexoxyethyl)-N-myristyl-dimethyl-ammonium fluoride in an amount sufficient to provide from about 0.1% to about 2.0% by weight of the total composition of ionizable fluorine and (2) a fluoride-compatible carrier, said composition being essentially free of anion-active adjuvants.

References Cited in the file of this patent

UNITED STATES PATENTS

| | | |
|---|---|---|
| 2,295,505 | Shelton | Sept. 8, 1942 |
| 2,580,473 | Sowa | Jan. 1, 1952 |
| 2,692,264 | Wojcik | Oct. 19, 1954 |
| 2,692,286 | Stayner | Oct. 19, 1954 |
| 2,698,338 | Heider | Dec. 28, 1954 |

FOREIGN PATENTS

| | | |
|---|---|---|
| 149,133 | Australia | Nov. 21, 1952 |

OTHER REFERENCES

Tseng et al.: Chem. Abst., vol. 31, 1937, col. 655.
Fowler et al.: Journal of the American Chemical Society, vol. 62 (1940), page 1143.
Shelton et al.: Journal of the American Chemical Society, vol. 68 (1946), page 758.